United States Patent
Ramos et al.

(10) Patent No.: US 6,384,703 B1
(45) Date of Patent: May 7, 2002

(54) FULLY IMMERSED MAGNETIC TRANSFORMER WITH MULTIPLE CONDENSING SURFACES AND METHOD

(75) Inventors: Sergio Ramos, Harbor City; Victor O. Asbury, Huntington Beach, both of CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/734,959

(22) Filed: Dec. 11, 2000

(51) Int. Cl.$^7$ ............................................. H01F 27/10
(52) U.S. Cl. ............................. 336/58; 336/61; 336/83
(58) Field of Search ............................. 336/58, 60, 61, 336/83, 179, 183

(56) References Cited

U.S. PATENT DOCUMENTS

| | | | |
|---|---|---|---|
| 2,292,337 A | * | 8/1942 | Ford |
| 4,321,421 A | | 3/1982 | Pierce |
| 4,543,446 A | | 9/1985 | Foss et al. |
| 5,408,209 A | | 4/1995 | Tanzer et al. |
| 5,594,315 A | | 1/1997 | Ramos et al. |

* cited by examiner

Primary Examiner—Lincoln Donovan
Assistant Examiner—Tuyen Nguyen
(74) Attorney, Agent, or Firm—Christopher DeVries

(57) ABSTRACT

A sealed transformer for use in charging the batteries of an electric automobile includes a housing that contains the secondary windings, a core and a dielectric fluid. A removable primary winding coupler is inserted into the housing to complete a magnetic circuit. During operation of the magnetic circuit, heat is continuously generated by the primary and secondary windings and the core. The fluid undergoes a first phase change and boils as it absorbs the generated heat. The boiling fluid absorbs additional heat and undergoes a second phase change is it turns into a vapor. The heat of vaporization is released into thin windows formed in the transformer housing when the vapors contact the relatively cooler windows and re-condense into a liquid. A continuous cycle of boiling, vaporizing, and condensing occurs during operation of the transformer to cool the transformer and to improve the power density of the transformer.

5 Claims, 3 Drawing Sheets

FULLY IMMERSED MAGNETIC TRANSFORMER WITH MULTIPLE CONDENSING SURFACES AND METHOD

BACKGROUND OF THE INVENTION

1. Field of the Invention

The present invention generally relates to compact, high frequency, inductive fast charge transformers that function as a charging port for electric vehicles. More particularly, the present invention relates to a transformer that combines the features of existing inductive charging systems, with immersion cooling methods to surpass thermal charging capacities in comparison to transformers using conventional thermal cooling techniques.

2. Discussion of the Prior Art

Inductive charging systems for use in charging batteries of electric vehicles and the like, utilize a charge port comprising a secondary winding and a core which function as a secondary transformer in the electric vehicle. A charge coupler or probe comprising a primary winding and a core function as a primary transformer when coupled to a power source. When the primary transformer, or charge probe is inserted into the charge port, a fast charge transformer is formed that can be used for charging electric vehicle batteries. The charging of electric vehicle batteries is performed at high frequency and charging rates, causing a great deal of heat dissipation and buildup within the housing of the transformer. Heat dissipation represents charging efficiency losses, which could be in the kilowatt range when operating the transformer at high charging rates. Keeping the transformer components cool during operation is required in order to maximize transformer performance and reliability.

Different approaches have been used to implement thermal management of inductive transformers. One approach has been to rely on heat conduction methods where heat from the secondary winding and core is swept across an air gap interface to on-board heat exchangers which are cooled by charge port fans. However, this approach has been found to be prohibitive due to the additional equipment required and the energy needed to power the equipment.

Another approach has been to interface the on-board vehicle cooling systems with the transformer. Although air or liquid from the vehicle cooling system may become available in some near-term electric vehicles, such provision cannot be universally guaranteed for all vehicles. Furthermore, at charge rates above 25 kW, the increase in size and power consumption of fans and air chillers becomes prohibitive.

Thus, the current technology that is available for cooling inductive charging transformers of the type used in charging electric vehicle batteries is inefficient. Therefore, it would be desirable to provide an improved transformer apparatus and method of cooling such transformers.

BRIEF DESCRIPTION OF THE DRAWINGS

The various features and advantages of the present invention may be more readily understood with reference to the following detailed description taken in conjunction with the accompanying drawings, wherein the reference numerals designate the structural elements, and in which.

DETAILED DESCRIPTION OF THE PRESENTLY PREFERRED EMBODIMENTS

Figure 1:
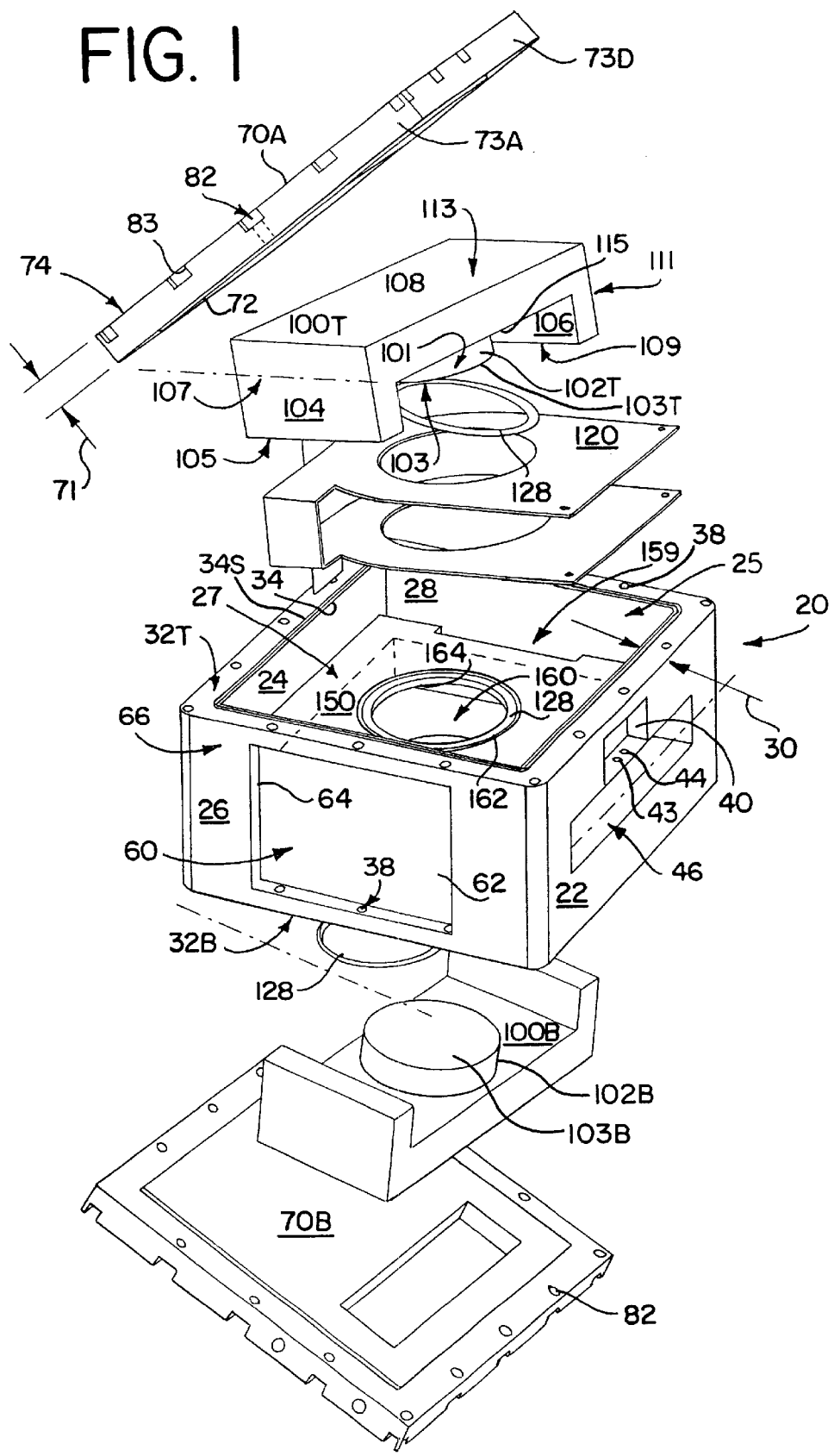
FIG. 1 is an exploded isometric view of a charging transformer in accordance with the principals of the present invention.

Referring to the drawing figures, FIG. 1 is an exploded perspective view of a non-ohmic charging transformer in accordance with the principles of the invention. A housing 20 for retaining and enclosing the operating components of the transformer includes sidewalls 22, 24, 26 and 28. Each wall has an identical thickness 30 that defines the top and bottom perimeter surfaces 32T, 32B. The top and bottom surfaces 32T, 32B are provided with an identical channel 34T, 34B for receiving a plastic-based O-ring seal 34S therein. The channels of this embodiment are square in configuration, although the shape is not considered a limitation. Also provided in surfaces 32T and 32B are a series of spaced holes 38 which are internally threaded for receiving anchoring bolts or screws (not shown) that are used to secure the covers 70A and 70B. Since walls 26 and 28 may be identically formed, only wall 26 will be discussed in detail, where like components will be referred to with the same reference numbers. A fluorine based coolant (not shown) is received within the chamber after it is closed and sealed. The coolant is benign to the plastic material of the O-ring 34S, protecting the seal from chemical destruction during transformer operation, which will be explained later.

The sidewall 26 includes a concave portion or window 60 having a surface 62 integrally formed as part of wall 26. Window 60 may be considered a thermal window in that heat generated within chamber interior 25 during operation of the transformer, is transferred by conduction through surface 62 to atmosphere. Surface 62 is thin relative to wall thickness 30, thereby facilitating heat removal from interior 25. The surface 62 is formed of the same material as wall 26, and in one embodiment, is only about a fourth of the thickness of wall thickness 30, although it should be understood that the thickness may be less or more than a fourth of wall thickness 30. The window 60 is offset from the exterior surface 66 of wall 26 to form a ledge 64. The lower-most portion of ledge 64 is seen to include the series of laterally spaced holes that are actually the same holes 38 extending upwardly from bottom perimeter surface 32B. Likewise, the holes 38 that were formed in the top perimeter surface 32T will extend through the upper-most portion (not seen) of ledge 64. The holes 38 formed in the top and bottom surfaces in this embodiment are in vertical alignment to each other.

Figure 2:
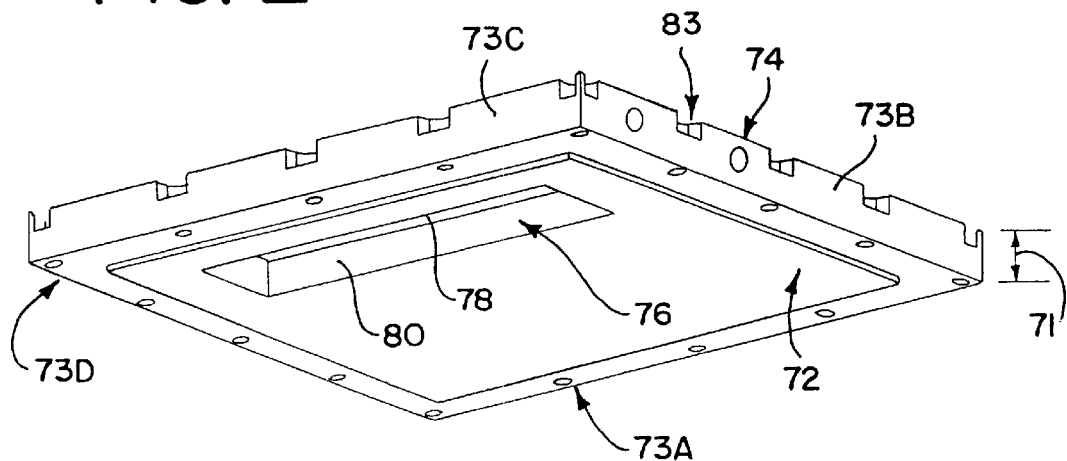
FIG. 2 is a perspective view of a transformer cover shown in FIG. 1.
Figure 3:
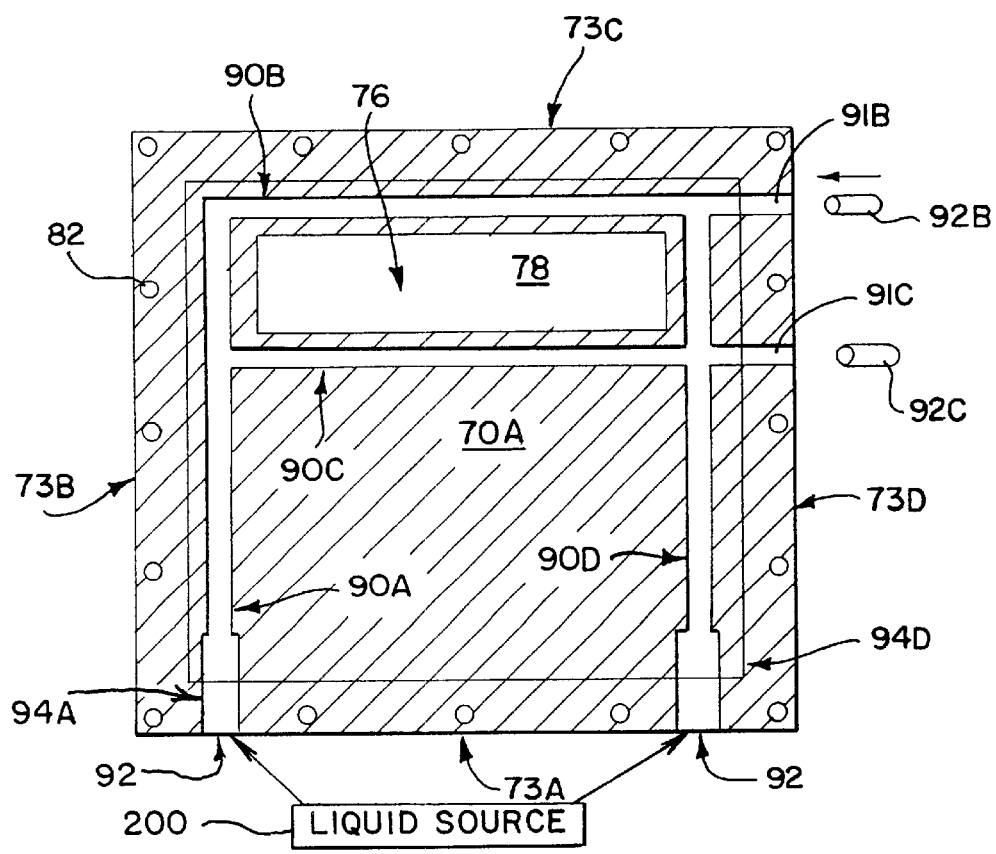
FIG. 3 illustrates a top cross sectional view of the cover of FIG. 2.

Further facilitating heat removal from the chamber interior 25 are the top and bottom covers 70A, 70B, which are identical to the other; therefore only the top cover will be described in detail. As FIGS. 2 and 3 show, the cover 70A of this embodiment has a generally rectangular shape, including an inside wall surface 72 and outside wall surface 74 defining a thickness 71 of the cover. In another embodiment, the cover may be square. Cover 70A also includes four interconnecting edge wall surfaces 73A–73D, which define a perimeter about the cover 70A. Adjacent the perimeter of cover 70A, are a series of spaced holes 82. The holes 82 extend entirely through the thickness 71 of the cover, from wall surface 72 to wall surface 74. The holes 82 are located to align with the holes 38 formed in housing 20 when the covers 70A and 70B are attached to the housing 20. The holes may be threaded, but in this embodiment, they are formed with smooth sidewalls to save machining costs. Each hole is also provided with a notched area 83 that is formed into the outside surface 74 for facilitating insertion and removal of threaded shank anchoring bolts (not shown), that extend through holes 82 and into holes 38. The threaded shank of the anchoring means would be threaded into engagement with the threads of holes 38 to secure each cover 70A and 70B to housing 20.

Each cover also includes a condensation concavity, depression or window 76 which may be formed adjacent to edge 73C. Window 76 may have a rectangular shape and may be formed as a relatively thin-walled metallic surface 78, similar to the window formed in chamber sidewall 26. The window 76 defines ledge 80. Additively, the thicknesses of ledge 80 and window 76 will equal the thickness 71 of the cover 70A. The window 76 is bounded between a pair of laterally spaced cooling arteries 90A and 90D that are formed internally within the cover 70A. Each artery 90A, 90D is formed as a throughbore 92 which may be centered within the surface area defining the thickness 71 of cover 70A. Each artery may be identical in dimensional size and extends from the edge surface 73A towards the edge surface 73C. Each artery also may include an enlarged end 94A, 94D that can include internal threads (not shown) for accepting cooling liquid line fittings that may be connected to the cover to feed a cold liquid source 200 to the arteries 90A, 90D.

The arteries 90A, 90D may be interconnected by cross arteries 90B, 90C, which are horizontally spaced from each other and which intersect at right angles to the arteries 90A, 90D. The cross arteries may have a respective extension portion 91B, 91C that extends to the edge wall surface 73D. The extension portions 91B, 91C can receive a plug 92B, 92C for closing the cross arteries 90B, 90C. The extension portions 91B, 91C are provided for clean-out purposes, but should the orientation of the chamber require the liquid source 200 to enter the cover from another side of the housing 20, the plugs can be removed so that the liquid source 200 can be installed to the extension portions 91B, 91C.

The window 76 functions as a conductive heat sink for attracting the heavy gaseous molecules such as water and air, which represent non-condensable matter that is entrapped within housing 20 during assembly. This aspect of the invention will become clearer during the explanation of operation. The liquid cooled arteries 90A and 90D may be used to enhance the thermal capacity of the window 76 by providing convective heat transfer between the heat generated within the chamber interior and the liquid circulated through the arteries. In this embodiment, only one of the arteries 90A or 90D functions as the liquid inlet, while the other artery 90A or 90D functions as the outlet. In other embodiments, each artery 90A, 90D may function as the liquid inlet. When arteries 90A and 90D are inlets, the residence time of the cooling liquid the cover 70A will be increased and the heat removal rate will then be proportionately. When each cover is attached to housing 20, the respective inside wall surfaces 72 will rest upon chamber surfaces 32T, 32B, and be fluidly sealed by O-ring 34S.

Figure 5:
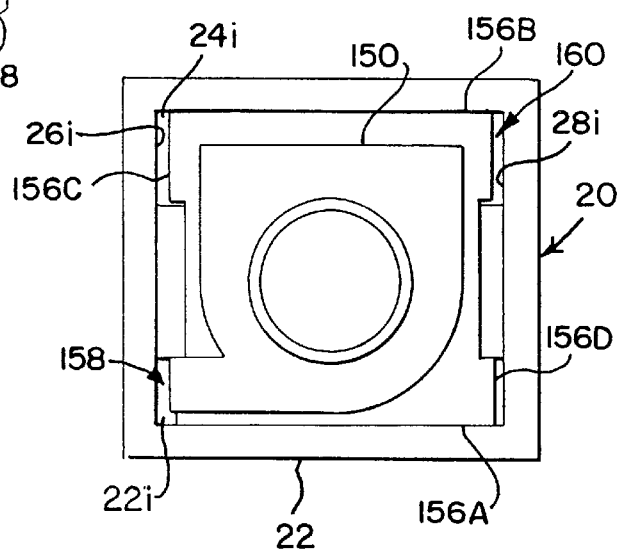
FIG. 5 is a top view of a partially assembled transformer in accordance with the invention.
Figure 6:
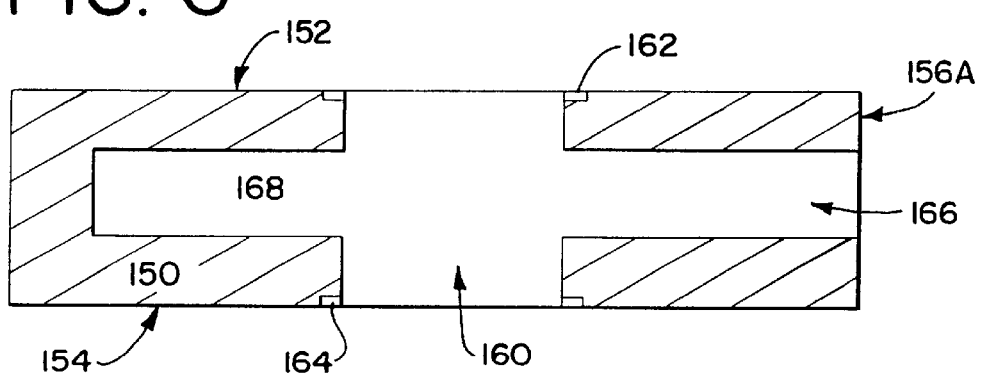
FIG. 6 is a sectional view of the dielectric separator plate shown in FIG. 1.

Referring to FIGS. 1, 5 and 6, the interior 25 of housing 20 includes a dielectric separator plate 150 disposed midway between top surface 32T and bottom surface 32B. The dielectric separator plate 150 divides the interior 25 of the housing 20 into an upper first compartment 27 and a lower second compartment (not shown) located below the plate 150. The perimeter edge walls 156A–D, the top face 152, and the bottom face 154 define the dielectric separator plate 150. The spaces between the edge walls 156C, 156D and interior of walls 26, 28 define passages 158 and 159. The other opposed edge walls 156A, 156B of the plate 150 are secured to respective interior portions of walls 24, 22. The opposed edge walls 156C, 156D are each provided with a respective rectangular cutout or channel 162, 164 that is generally centered within the distance existing between walls 156A, 156B. Turning to FIG. 6, it is seen that edge wall 156A is provided with cutout or slot 166 that communicates with the interior pocket 168 with the throughslot or opening 46 formed in the housing wall 22. The interior pocket 168 receives a primary winding charging paddle (not shown) that is slidably inserted through the throughslot 46 prior to operation of the transformer, as will be explained later herein. The center of separator plate 150 is provided with circular hole 160 that extends through the plate and through interior pocket 168. Circular channels 162, 164 are respectively formed into the top face 152 and bottom face 154 around the peripheral edge of hole 160. Each channel 162, 164 is provided with an O-ring 128 for preventing the dielectric fluid that fills the upper and lower compartment of the chamber 25 from reaching the interior pocket 168 of the dielectric separator plate 150.

Figure 4:
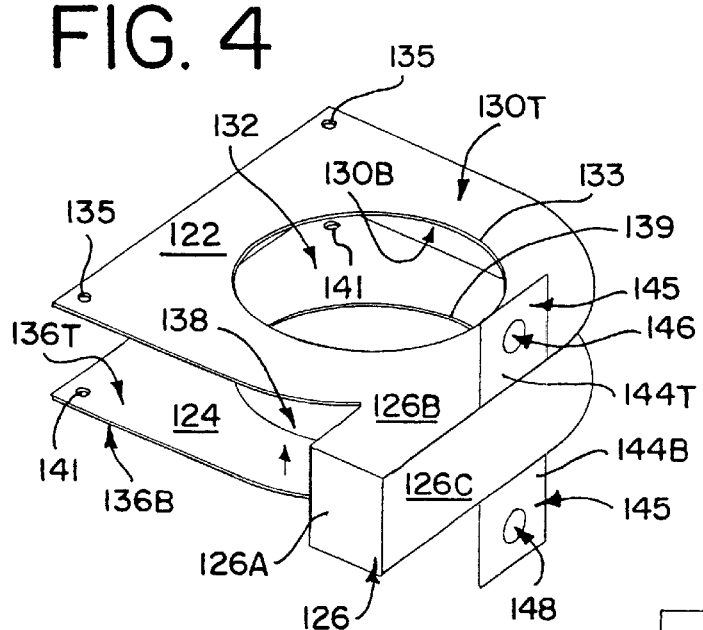
FIG. 4 is a perspective view of the secondary windings used in accordance with the charge transformer of the invention.

The secondary windings 120 of the present invention are uniquely shaped and are formed of interconnected planar plates. In the embodiment shown in FIGS. 1 and 4, the secondary is considered to be a four turn secondary, having two top turns and two bottom turns. As seen in FIG. 4, first and upper plate 122 has a top surface 130T, a bottom surface 130B, and a central hole 132 that is delimited by perimeter surface 133. The second and lower plate 124 is identical to the upper plate and it likewise includes a top and a bottom surface 136T, 136B and a central hole 138 delimited by a perimeter surface 139. The plates are interconnected by a U-shaped member 126 comprising a vertical leg 126A and two horizontal legs 126B and 126C, which are integrally formed as planer extensions of each plate. Each plate 122, 124 also includes a respective set of spaced holes 135, 141 on one end of each plate 122, 124. The holes 135, 141 are in substantial vertical alignment with each other. A pair of anchoring means (not shown) is inserted through holes 135, 141 to join each plate 122, 124 to the dielectric separator plate 150. The anchoring means may comprise self-tapping screws or comprise other well-known fastening arrangements. Each plate 122, 124 is also provided with an identical vertical strap 144T and 144B that is integrally formed as another extension of each plate. Each strap 144T and 144B is disposed perpendicular to the respective plate, and as seen, project in opposite directions. Each strap 144T, 144B also includes a respective, identically sized posthole, where the top posthole is designated at 146 and the bottom posthole designated at 148. When the secondary windings 120 and separator plate 150 are disposed within housing 20, postholes 146,148 are received over the posts 52T, 52B protruding from interior wall 24i, as described earlier. In order to facilitate positioning of the dielectric separator plate 150 into interior 25, it should be understood that the secondary windings 120 must be attached to the dielectric separator plate 150 prior to insertion within interior 25. Once inserted, the outside surfaces 145 of each vertical strap will contact against the interior surface 24i of wall 24, with each hole 146, 148 receiving a post 52T, 52B therein. The contact between the posts 52T, 52B and the surfaces delimiting each hole 146, 148, is a close contact to ensure continuous electrical contact between the posts 52T, 52B and the secondary windings 120. The vertical extent of leg 126A that joins each plate 122, 124 is equivalent to the thickness of dielectric separator plate 150, so that the upper and lower plates 122, 124 respectively contact the surfaces 152, 154 of the dielectric separator plate 150 after assembly. This arrangement promotes compatibility of the internal components.

The compartment 27 and compartment (not shown) located directly beneath also includes a respective core 100T, 100B that is structurally and functionally identical to the other, thus only 100T will be described in detail. Core 100T is generally U-shaped in configuration, having laterally spaced vertical legs 104, 106 interconnected by bridge member 108. The leg 104 has an outside surface 107 and a bottom edge surface 105, while leg 106 has outside surface 109 and edge surface 111. The bridge member 108 has an outside surface 113 and an inside surface 115, which includes an upstanding cylindrically shaped post 102 projecting therefrom. The post 102 is integrally formed as part of the core and is generally centered between the vertical legs 104, 106. The post 102 has a perimeter surface 101 and a top surface 103, with the perimeter surface 101 being in close frictional tolerance within O-ring 128 when inserted into hole 160 of dielectric separator plate 150.

Since there is a second O-ring 128 located on the bottom perimeter of hole 160, the bottom post 102B will likewise be in close frictional contact with the bottom O-ring 128.

A respective leg 104, 106 from each side of the core 100T will be received within a passageway 158, 160, without the outside surfaces 107, 111 contacting the interior surfaces 26i and 28i. The height of each leg is predetermined so that the end surfaces 105 and 109 of each leg 104, 106 will contact against corresponding surfaces 105B, 109B on the bottom core 100B when the cores 100T, 100B are received in the interior 25 of housing 20. The height of each post 102T, 102B is also pre-determined so that each top surface 103T, 103B will contact the other when assembled. Thus, the outside surfaces 105, 109 of vertical legs 104, 106 will contact against a corresponding surface on core 100B in the passageway 158, 160 while the surface 103 of the post 102 will contact against a corresponding surface on core 100B inside the interior chamber 168 of the dielectric separator plate 150.

After the separator plate 150, secondary windings 120 and cores 100T, 100B are assembled into chamber interior 25, a liquid dielectric fluorinate is added to the chamber 25. This step entails securing a first cover 70A or 70B to one of the surfaces 32T or 32B by tightening the bolts (not shown) into threaded engagement into holes 38. It should be obvious that this step first involves inserting the bolts into the holes 82 in the covers 70A, 70B. Once all of the bolts in one cover 70A or 70B are tightened, the chamber is turned over so that the second cover 70A or 70B can be similarly anchored to the housing 20. As seen in FIG. 1, a fill port 170 and plug 172 are provided in wall 26 for adding the fluid to the housing 20. The fluorinated liquid added to the interior 25 will fill one of the compartments and then fill the second compartment through the passages 158, 160 to a fluid level that will completely cover both cores 100A, 100B. The fill port 170 may be located in either of the walls 26 or 28 if desired.

The assembled housing 20 now represents one half of a non-ohmic transformer. A primary winding (not shown) is to be provided through the large rectangular through-slot 46 formed in wall 22, and through the cut-out 166 that leads into interior pocket 168 of the dielectric separator plate 150, such that the primary winding contacts the top and bottom posts 102T, 102B of the cores 100T, 100B. The primary winding probe provides the windings necessary to complete the transformer. Since those in the art are familiar with the construction of the primary winding, no description will be provided. The second and smaller rectangular through-slot 40 is seen disposed above through-slot 46. The top through-slot 40 receives a wiring harness (not shown) linked to an onboard computer (not shown) that is tied to the main operations computer of the vehicle (not shown). The intelligence/communication system that is received in the top through-slot 40 represents an input/response communication module to the main computer system for receiving protocol with the other (primary) transformer half. The module is linked to the vehicle on-board battery charging system, thus completing the communication loop of various codes, and will allow charging to begin when system communication is complete. The top through-slot 40 has a perimeter surface that includes a pair of holes 43, 44 that function to assist anchoring the wiring harness.

In operation, an alternating power is provided to electrically send power through the primary windings. When the power is turned on, the transformer begins to function and the cores 100T, 100B, as well as the plates 122, 124 begin to generate very large amounts of heat in the form of normal hysteresis losses that naturally occur within transformers. At low power transfer, most of the losses originate from the core in a very non-uniform manner while at high power levels, the core losses combine with the winding losses to create the bulk of the dissipated power. Winding losses are equal to the square IRMS times the AC Resistivity of the winding material, which is copper. For a 100 kW example, the IRMS will be approximately 300 Amps which is rather considerable. Thus, it can be appreciated that an effective cooling system is required in order for the transformer to function in an efficient manner. However, using current cooling technology, the overall size of the cooling system would be prohibitive because currently, the AC charge port utilizes a liquid-to-air heat exchanger with laminated windings glued to the cores. As previously mentioned, using air as the cooling medium for dissipating heat losses is very inefficient. The present invention eliminates the need for fans, heat sinks, and bonding processes, while integrating the windings with internal condensing surfaces in order to directly enhance thermal management (heat removal), which in turn, indirectly increases performance and reliability of the transformer.

The invention provides a compact, fully immersed transformer that has multiple condensing surfaces, which allow the transformer to efficiently operate on any charging level (level 1, 2 and 3 as defined in SAE1773). Full immersion is a closed-loop boiling and condensation cycle where dissipated heat is removed directly from the exposed heat-producing source (core/windings) first by causing the liquid to boil. As additional heat is added to the boiling fluorinated fluid from the heat source, the liquid begins to change phase and vaporize. The generated vapor is then condensed on the condensing surfaces, which are covers 70A, 70B. Such a cycle has a very high heat transfer coefficient compared to conventional heat removal methods e.g., conduction/convection and liquid to air techniques. The fact that the heat source and thermal management working fluid are in intimate contact with each other allows temperatures to stabilize effectively and causes heat sinks to be unnecessary. The unexpected result is a substantial size reduction, component count minimization, temperature control enhancement and failure rate neutralization. Full immersion thereby provides a three-fold performance improvement: thermal control, size reduction and increased reliability. Furthermore, the present invention increases the power density, meaning it can transfer more power per cubic inch than former transformers. The high heat transfer coefficients associated with the boiling and condensation processes allows full immersion to accommodate extremely high surface and volumetric concentrated heat rates in considerably smaller packaging densities. It should be noted that by tailoring the desired boiling temperature of the working fluid and a fixed volume, the unit may be operated at a near-constant pressure. Furthermore, the non-condensables, which are the water vapors entrapped within chamber interior 25 during construction, are also vaporized and cooled in a similar fashion as the fluorinated organic fluid. However, the window 76 on each cover 70A, 70B is specifically provided for promoting the release of the heat of vaporization of these vapors.

The prototype working fluid is a fluorinated organic compound having a boiling temperature of 53° C., which is purposely chosen to generally correspond to the targeted exterior touch temperature that is desired (50° C.). In this regard, those in the art would realize that there is a family network of completely fluorinated organic compounds with excellent, compatible dielectric properties for use with this invention. In principle, the working fluid that is selected can be of the type used in vapor reflux soldering and the boiling temperature of the fluid can be tailored by forming a two-component mixture. The fluorinated organic fluids are environmentally safe and are compatible with metals, plastics and elastomers. Therefore, no special material composition requirements are needed for the O-rings that seal the covers and separator plate.

The cost associated to produce the invention is only a fraction of the cost to produce existing designs because the invention eliminates laminates, and specialized or bonded heat exchanger components. Therefore, it can be assembled in a fraction of the time it takes to assemble an existing charge port. All of these features translate into a reduced assembly process, resulting with an estimated cost reduction of 65%.

While the apparatus herein disclosed forms the preferred embodiment of this invention, this invention is not limited to those specific apparatus and methods disclosed, and changes can be made without departing from the scope of this invention which is defined in the appended claims.

We claim:

1. A vapor cooled automobile charging transformer for use with a primary inductive charge coupler having a primary electric winding that attaches to a fixed power supply, comprising:
    a housing having a through-slot for receiving the inductive charge coupler, the housing including multiple window surfaces and an interior and exterior;
    a transformer secondary winding disposed in the housing interior;
    a magnetic core disposed in the housing interior for completing a magnetic circuit through the primary and secondary windings, the secondary winding and core continuously generating heat during operation; and
    a dielectric liquid retained within the housing interior and submersing the core and secondary windings, the dielectric liquid continuously absorbing the heat generated by the core and secondary windings, wherein some of the liquid first boils and then changes phase and vaporizes, whereby the vapors contact the windows and immediately cool, causing the vapors to condense to a liquid state, whereupon during the phase change from vapor to liquid, the heat of vaporization is released and conducted out of the housing.

2. The vapor cooled transformer of claim 1, wherein the dielectric liquid absorbs and releases heat during a dual phase change, the first phase change occurring when the fluid boils and the second phase change occurring when the vapors cool and re-condense into a liquid.

3. The vapor cooled transformer of claim 1, wherein the fluid remains at a constant pressure during operation of the transformer.

4. The vapor cooled transformer of claim 2, wherein the vapors return to a liquid state upon contacting one of the housing condensing windows.

5. The vapor cooled transformer of claim 4, wherein the exterior of the housing is cooled with a second fluid, thereby increasing a heat removal rate of the transformer.

* * * * *